US011419149B2

(12) United States Patent
Andreoli-Fang et al.

(10) Patent No.: US 11,419,149 B2
(45) Date of Patent: *Aug. 16, 2022

(54) SYSTEMS AND METHODS FOR LATENCY REDUCTION IN BACKHAUL

(71) Applicant: CABLE TELEVISION LABORATORIES, INC, Louisville, CO (US)

(72) Inventors: Jennifer Andreoli-Fang, Boulder, CO (US); Balkan Kecicioglu, Erie, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 43 days.

This patent is subject to a terminal disclaimer.

(21) Appl. No.: 17/001,583

(22) Filed: Aug. 24, 2020

(65) Prior Publication Data
US 2020/0389920 A1 Dec. 10, 2020

Related U.S. Application Data

(63) Continuation of application No. 15/950,815, filed on Apr. 11, 2018, now Pat. No. 10,757,735, which is a
(Continued)

(51) Int. Cl.
H04W 74/08 (2009.01)
H04W 56/00 (2009.01)
(Continued)

(52) U.S. Cl.
CPC ..... *H04W 74/0816* (2013.01); *H04W 56/001* (2013.01); *H04W 72/12* (2013.01); *H04W 84/12* (2013.01)

(58) Field of Classification Search
CPC .................................. H04W 74/0816
See application file for complete search history.

(56) References Cited

U.S. PATENT DOCUMENTS

2007/0081514 A1* 4/2007 Shirakura ............. H04J 3/0682
370/503
2016/0100396 A1* 4/2016 Seok .................... H04B 7/0628
370/329
(Continued)

*Primary Examiner* — Joseph E Avellino
*Assistant Examiner* — Abdeltif Ajid
(74) *Attorney, Agent, or Firm* — Armstrong Teasdale LLP

(57) ABSTRACT

A wireless communication node includes a receiving portion configured to detect, over a wireless communication channel, a request to send (RTS) message from a transmitting station within a communication vicinity of the wireless communication node. The RTS message includes at least one duration field. The wireless communication node further includes a processor configured to (i) calculate an estimated time parameter, (ii) add the estimated time parameter to a current timestamp of the wireless communication node, and (iii) form a control packet from the RTS message, the at least one duration field, and the estimated time parameter. The wireless communication node further includes a transmitting portion configured to transmit over the wireless communication channel (i) a clear to send (CTS) message the transmitting station, and (ii) the control packet to a modem in operable communication with the wireless communication channel.

20 Claims, 6 Drawing Sheets

Related U.S. Application Data continuation-in-part of application No. 15/910,798, filed on Mar. 2, 2018, now Pat. No. 11,166,311.

(60) Provisional application No. 62/484,196, filed on Apr. 11, 2017, provisional application No. 62/466,098, filed on Mar. 2, 2017.

(51) Int. Cl.
*H04W 72/12* (2009.01)
*H04W 84/12* (2009.01)

(56) References Cited

U.S. PATENT DOCUMENTS

| | | | |
|---|---|---|---|
| 2017/0265216 A1* | 9/2017 | Andreoli-Fang | ... H04L 12/2801 |
| 2018/0020476 A1* | 1/2018 | Aijaz | ............... H04W 8/005 |

* cited by examiner

SYSTEMS AND METHODS FOR LATENCY REDUCTION IN BACKHAUL

CROSS REFERENCE TO RELATED APPLICATIONS

This application is a continuation of U.S. application Ser. No. 15/950,815, filed Apr. 11, 2018. U.S. application Ser. No. 15/950,815 is a continuation in part of U.S. application Ser. No. 15/910,798, filed Mar. 2, 2018. U.S. application Ser. No. 15/910,798 claims the benefit of and priority to U.S. Provisional Patent Application Ser. No. 62/466,098, filed Mar. 2, 2017. U.S. application Ser. No. 15/950,815 also claims the benefit of and priority to U.S. Provisional Patent Application Ser. No. 62/484,196, filed Apr. 11, 2017. The disclosures of all of these prior applications are incorporated herein by reference in their entireties.

BACKGROUND

The field of the disclosure relates generally to wireless communication networks, and more particularly, to wireless communication networks utilizing carrier sense multiple access (CSMA).

CSMA with collision avoidance (CSMA/CA) is a network multiple access method, sometimes referred to as "listen-before-talk" (LBT), in which nodes utilize carrier sensing, but attempt to avoid collisions by transmitting only when the channel is sensed to be idle (i.e., not being used). The CSMA/CA protocol typically operates in the data link layer of the telecommunication model of the network. Conventional Wi-Fi, Long Term Evolution (LTE) Licensed Assisted Access (LAA), and MulteFire technologies have recently adopted the CSMA/CA scheme as a mechanism for medium access control (MAC). In such conventional schemes, a transmitter/transceiver of a node defers its transmission (when another node is detected) and applies an additional back off time before starting its own transmission. During this back off time, the node monitors the channel and performs clear channel assessment (CCA). If the channel is not busy at the end of this period, the transmitter/transceiver initiates transmission. The transmitting node then monitors the environment using uniform a beam-pattern, listening for transmissions from all directions.

FIG. 1 is a schematic illustration of a conventional wireless transmission system 100 employing CSMA/CA for a uniform beam pattern 102 radiating from a central transmitter 104. System 100 implements a CSMA/CA protocol in a Wi-Fi/LTE LAA environment. Central transmitter 104 is, for example, a transmitting access point (AP). System 100 includes an intended mobile user 106, which wirelessly receives signals from central transmitter 104 over a communication link 108 under consideration. System 100 further includes a plurality of neighboring APs 110 and a plurality of neighboring mobile users 112, respectively communicating over neighboring links 114.

In this example, the respective APs and mobile users are illustrated as having multiple antennas. In practical operation, a given AP will typically have more antennas and more signal processing capability than a typical mobile user. Operation of neighboring APs 110 and neighboring mobile users 112 generates interferences 116 to and from central transmitter 104. Because beam pattern 102 is uniform in all directions from central transmitter 104, central transmitter backs off equally in the respective focus direction of each interference 116, when detected, and therefore represents an inefficient application of transmission resources.

BRIEF SUMMARY

In an embodiment, a wireless communication node includes a transmitting portion configured to transmit over a wireless communication channel a plurality of data packets to a first neighboring node, a receiving portion configured to detect the first neighboring node, and a processor configured to calculate a beamforming vector for the first neighboring node and direct the transmitting portion to transmit the plurality of data packets to the first neighboring node with beamforming based on the calculated beamforming vector.

In an embodiment, a method for transmitting over a wireless communication channel is provided. The method is implemented by a first node employing a carrier sense multiple access (CSMA) protocol. The method includes steps of detecting channel state information of a second node within a transmission vicinity of the first node, calculating a beamforming vector to transmit data from the first node to the second node, performing clear channel assessment on the wireless communication channel using the calculated beamforming vector, measuring an average received power of the wireless communication channel based on the clear channel assessment, determining that the measured average received power of the wireless communication channel is less than a predetermined energy detection threshold, and initiating, by the first node, a data transmission with beamforming over the wireless communication channel.

In an embodiment, a wireless communication node includes a receiving portion configured to detect, over a wireless communication channel, a request to send (RTS) message from a transmitting station within a communication vicinity of the wireless communication node. The RTS message includes at least one duration field. The wireless communication node further includes a processor configured to (i) calculate an estimated time parameter, (ii) add the estimated time parameter to a current timestamp of the wireless communication node, and (iii) form a control packet from the RTS message, the at least one duration field, and the estimated time parameter. The wireless communication node further includes a transmitting portion configured to transmit over the wireless communication channel (i) a clear to send (CTS) message the transmitting station, and (ii) the control packet to a modem in operable communication with the wireless communication channel.

In an embodiment, a method is provided for transmitting over a wireless communication channel implementing Wi-Fi transmissions in a Data Over Cable Service Interface Specification (DOCSIS) backhaul by a first node employing a carrier sense multiple access (CSMA) protocol. The method includes steps of receiving a request to send (RTS) message from a second node transmitting within a vicinity of the first node, wherein the RTS message includes a duration field, calculating an estimated time parameter based at least in part on the duration field, forming a control packet from the received RTS message and the estimated time parameter, and transmitting (i) a clear to send (CTS) message to the second node, and (ii) the control packet to at least one modem device.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
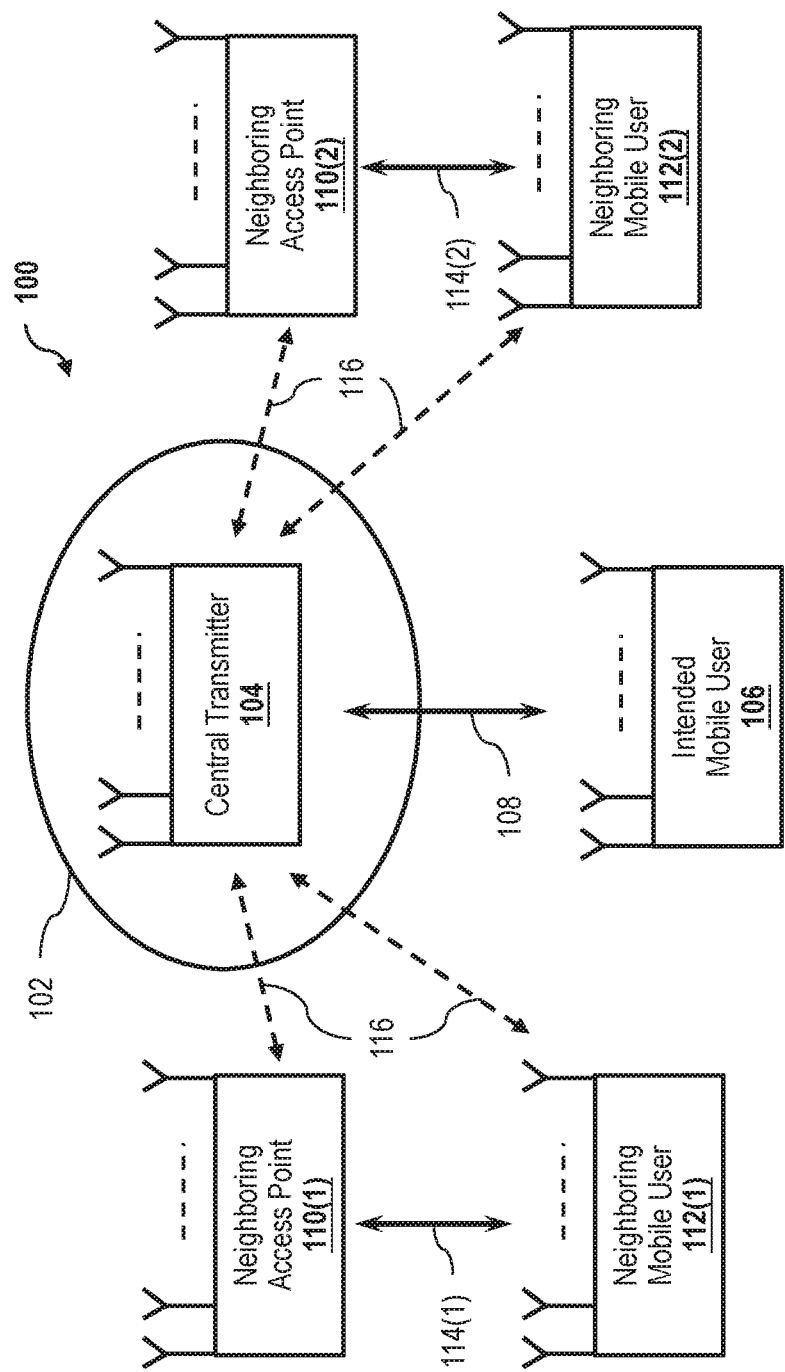
FIG. 1 is a schematic illustration of a conventional wireless transmission system employing CSMA/CA for a uniform beam pattern.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

"User equipment" includes an electronic device or system utilizing a technology protocol such as LTE, and "Wi-Fi device" includes an electronic device or node, such as an AP, station, or STA, that is capable of utilizing an existing 802.11 protocol. "Mobile user" may include a user equipment and/or a Wi-Fi device, and may further include, without limitation, one or more of a laptop, a personal computer (PC), a personal digital assistant (PDA), a Wi-Fi phone, a smartphone, and a cellular telephone. The respective nodes and user devices may include a transceiver or transmitter and receiver combination, and/or an 802.11-conforming MAC layer and physical (PHY) layer interface to a wireless medium.

The following description features systems and methods for incorporating the spatial properties of a channel transmission in a CSMA scheme, which may include a CSMA/CA access system. The present embodiments relate to operation and management of a transmitter or transceiver using the spatial properties of the transmission channel, and methods for efficient coexistence of neighboring nodes utilizing CSMA/CA.

In the exemplary embodiment, a CSMA strategy is implemented for a transmitting node employing beamforming to focus the node's transmission energy in a spatial direction of interest to reduce the interference from and to other nodes. RTS, CTS, and ACK frame transmissions may be transmitted according to conventional techniques, without beamforming, to allow continued measurement of potential interferers. Through the advantageous techniques described herein, spatial diversity of the channel is utilized to enable increased communication in dense deployments of nodes.

Recent wireless technologies employ multiple antennas to increase throughput and/or improve robustness. Beamforming is a multiple antenna transmission technique that focuses radiated energy in the direction(s) of interest to provide additional gains at the receiver. The systems and methods herein advantageously employ beamforming to focus the signal of the transmitter in limited directions, that is, more in some directions than others. The signal therefore will not cause uniform interference to other nodes in all directions. Hence, because it is inefficient for the transmitter to back off signals in all directions at the same energy detection level, the transmitter of the present embodiments backs off only in directions overlapping with its beamformed transmission.

The present embodiments achieve beamforming transmission primarily in two different ways: (1) based on the channel measurement of the reverse link and making use of channel reciprocity (applicable, for example, with time division duplex (TDD)); or (2) based on the channel measurement and feedback from the receiver. In either way, the radiated energy is focused along main reflected paths, toward an intended node, thereby reducing interference to other users/nodes, as shown in FIG. 2, below.

Figure 2:
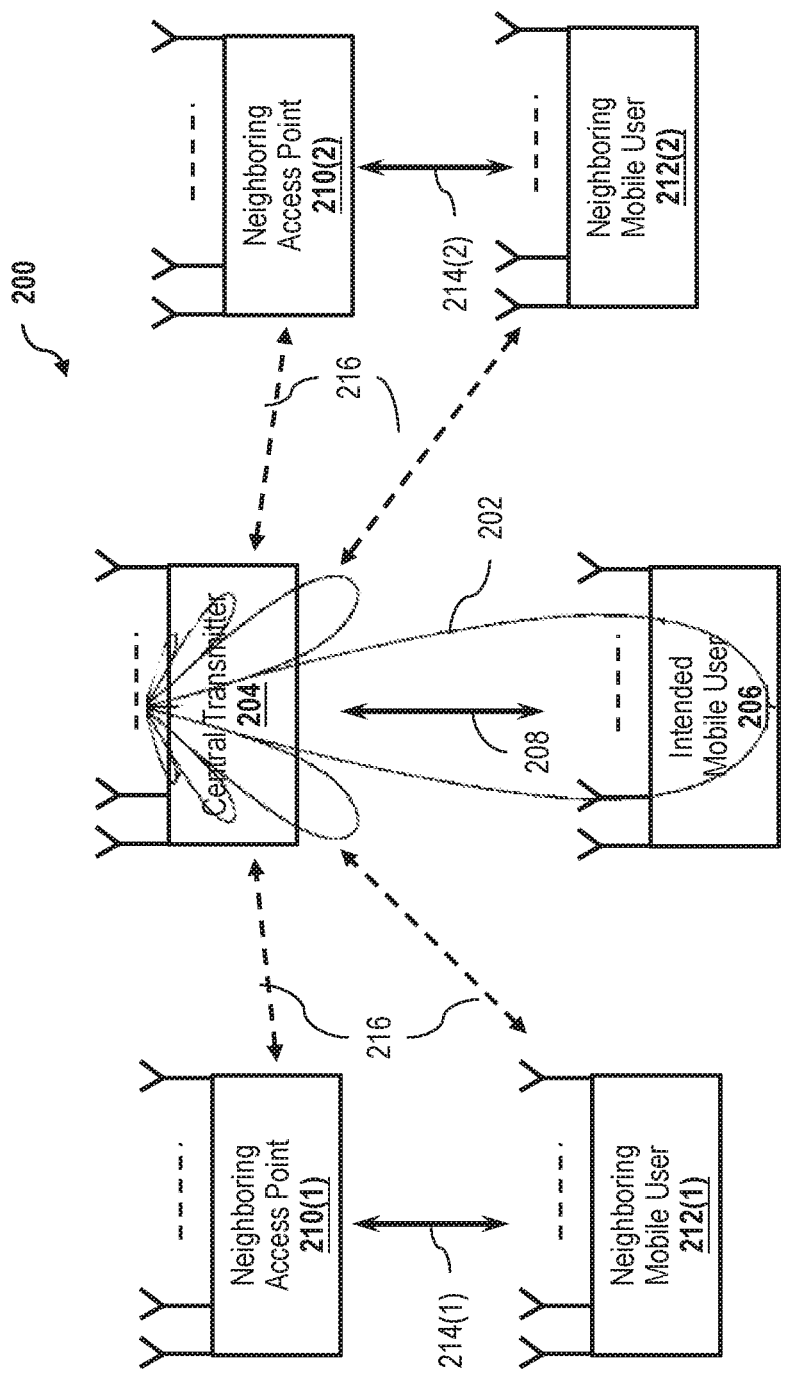
FIG. 2 is a schematic illustration of a wireless transmission system employing CSMA/CA using a beamforming pattern, according to an embodiment.

FIG. 2 is a schematic illustration of a wireless transmission system 200 employing CSMA/CA, and using a beamforming pattern 202 transmitting from a central transmitter 204. System 200 is architecturally similar to system 100, FIG. 1, and also implements a CSMA/CA protocol in a Wi-Fi/LTE LAA environment, but implements beamforming instead of a uniform beam pattern. In an exemplary embodiment, central transmitter 204 is a transmitting access point (AP). System 100 includes an intended mobile user 206, which wirelessly receives signals from central transmitter 204 over a communication link 208 under consideration. System 200 further includes a plurality of neighboring APs 210 and a plurality of neighboring mobile users 212, respectively communicating over neighboring links 214. As illustrated, the respective APs and mobile users have multiple antennas, but may have more or fewer, and a particular AP may have more antennas and signal processing capability than a particular mobile user.

Operation of neighboring APs 210 and neighboring mobile users 212 generates interferences 216 to and from central transmitter 204. Different from system 100 though, the transmitted energy from beamforming pattern 202 is focused in relatively few directions in system 200, and particularly focused in the direction of intended mobile user 206. Accordingly, by advantageously utilizing the spatial properties of the channel and beamforming pattern 202, it is significantly more likely that unintended users (i.e., neighboring APs 210 and neighboring mobile users 212) will observe considerably less interference 216 from central transmitter 204 employing beamforming, than would neighboring users under the conventional system 100 employing a uniform beam pattern. According to this advantageous architecture and technique, the transmitted energy of central transmitter 204 is directed toward intended mobile user 206, and would only back off when experiencing interference in the direction of beamforming pattern 202, or significant overlap of energy in portions thereof. Energy and power of central transmitter 204 may therefore be more efficiently managed and distributed according to the actual energy radiated a given direction.

In operation of the exemplary embodiment, central transmitter 204 acquires channel vector information of intended mobile user 206, and then performs CCA using the channel vector instead of the uniform channel sensing employed in system 100. CCA using the channel vector thus provides more accurate information regarding the interference that will actually be caused by central transmitter 204 along the channel vector. As illustrated in FIG. 2, the effect of interference 216 greatly varies but according to the energy level actually radiated in the direction of the respective portions of beamforming pattern 202. In this example, the effect of interferences 216(1) and 216(4) is almost nonexistent, while the effect of interferences 216(2) and 216(3) is relatively minimal, since interferences 216(2) and 216(3) each only overlap relatively minor portions of beamforming pattern 202.

Figure 3:
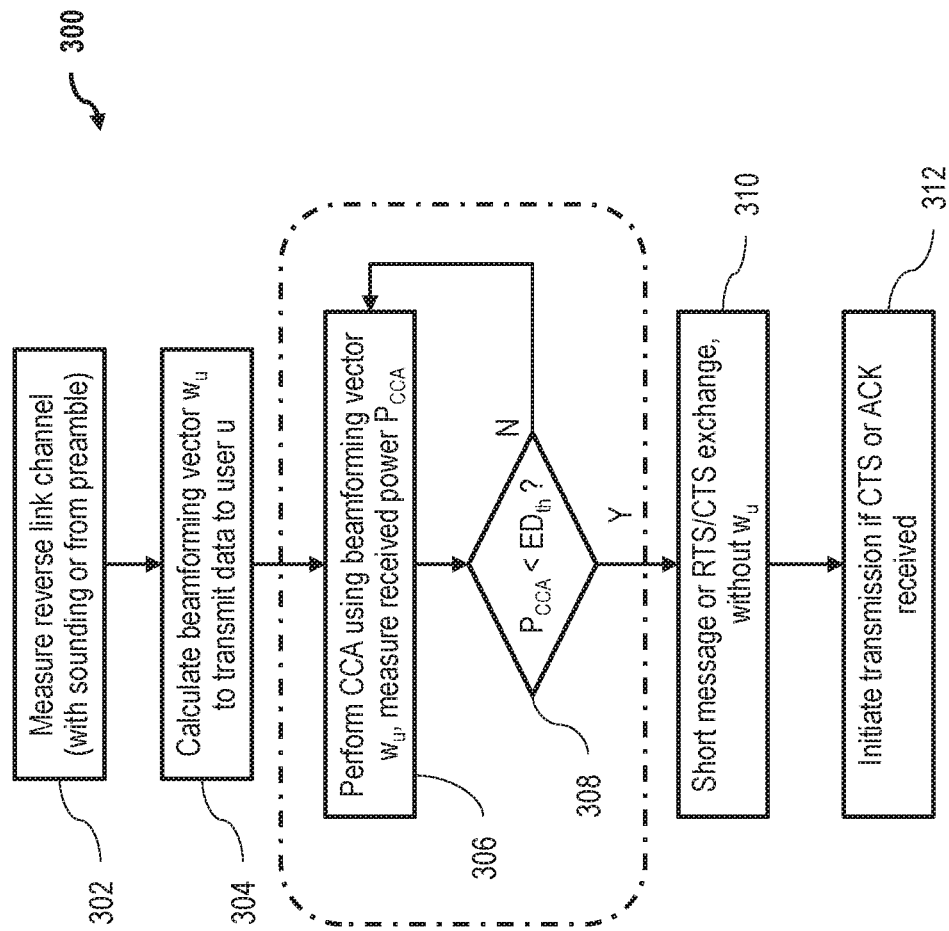
FIG. 3 is a flow chart diagram of an exemplary transmission process for the system depicted in FIG. 2.

FIG. 3 is a flow chart diagram of an exemplary transmission process 300 for system 200, FIG. 2. The exemplary embodiment, process 300 may be implemented by the MAC layer or PHY layer (not shown in this example) of central transmitter 206 in system 200, or a processor thereof. In operation, process 300 begins at step 302, in which the reverse link channel is measured. In some embodiments of step 302, the reverse link channel is measured with sounding. In other embodiments of step 302 the reverse link channel is measured from the preamble.

In step 304, the beamforming vector $w_u$ is calculated to transmit data to a user u (i.e., intended mobile user 206, FIG. 2. In step 306, as an improvement over conventional beamforming techniques, process 300 performs CCA using the beamforming vector $w_u$, and the received power therefrom, $P_{CCA}$, is then represented by $$P_{CCA} = E\{|w_u^H y|^2\}.$$

Step 308 is a decision step. In step 308, process 300 determines if the received power $P_{CCA}$ is less than an energy detection threshold ($ED_{threshold}$). If $P_{CCA} < ED_{threshold}$, then process 300 proceeds to step 310. If $P_{CCA} \geq ED_{threshold}$, then process 300 engages a back off scheme and returns to step 306.

In step 310, upon completion of CCA performance, process 300 transmits a short message, or an RTS/CTS exchange in the conventional manner, without having to use the beamforming vector $w_u$. In step 312, process 300 initiates transmission (i.e., by central transmitter 204, FIG. 2) if a CTS or an ACK is received at the receiver or receiving portion (not separately shown) of central transmitter 204. These steps are described further below with respect to FIGS. 4 and 5.

According to the advantageous techniques of process 300, CSMA is more efficiently implemented with respect to a beamforming vector. That is, in an exemplary embodiment, it may be assumed that a transmitting node (e.g., central transmitter 204, FIG. 2) obtains channel state information for a receiver (e.g., intended mobile user 206) from measurement of, or feedback from, the receiver. From this channel state information, the transmitting node advantageously calculates the beamforming vector $w = [w_0, w_1, \ldots, w_{N-1}]$, where N is the number of transmitting antennas. When a received signal from other nodes is received containing detected ACK and/or CTS messages, a potential "victim node" may be identified.

Further in this technique, received vector y is similarly defined as $y = [y_0, y_1, \ldots, y_{N-1}]$. Accordingly, the CCA performance effectively measures the average power $P_{CCA}$ according to $P_{CCA} = E\{|w^H y|^2\}$, and the back off scheme engages if this measured power is greater than the energy detection threshold $ED_{threshold}$.

The present inventor contemplates that future implementations of the present embodiments may seek to maximize the efficiency of the transmission exclusively in the direction of the beamforming focus, such that the potential interferers may not hear the ongoing transmission (e.g., outside of war not overlapping with the focus of beamforming pattern 202, FIG. 2). Accordingly, as explained further below with respect to FIG. 4, a transmitting node according to the systems and methods herein may be further configured to transmit RTS, CTS, and ACK/NACK frames, messages, or transmissions apart from the beamforming to mitigate this potential problem.

Figure 4:
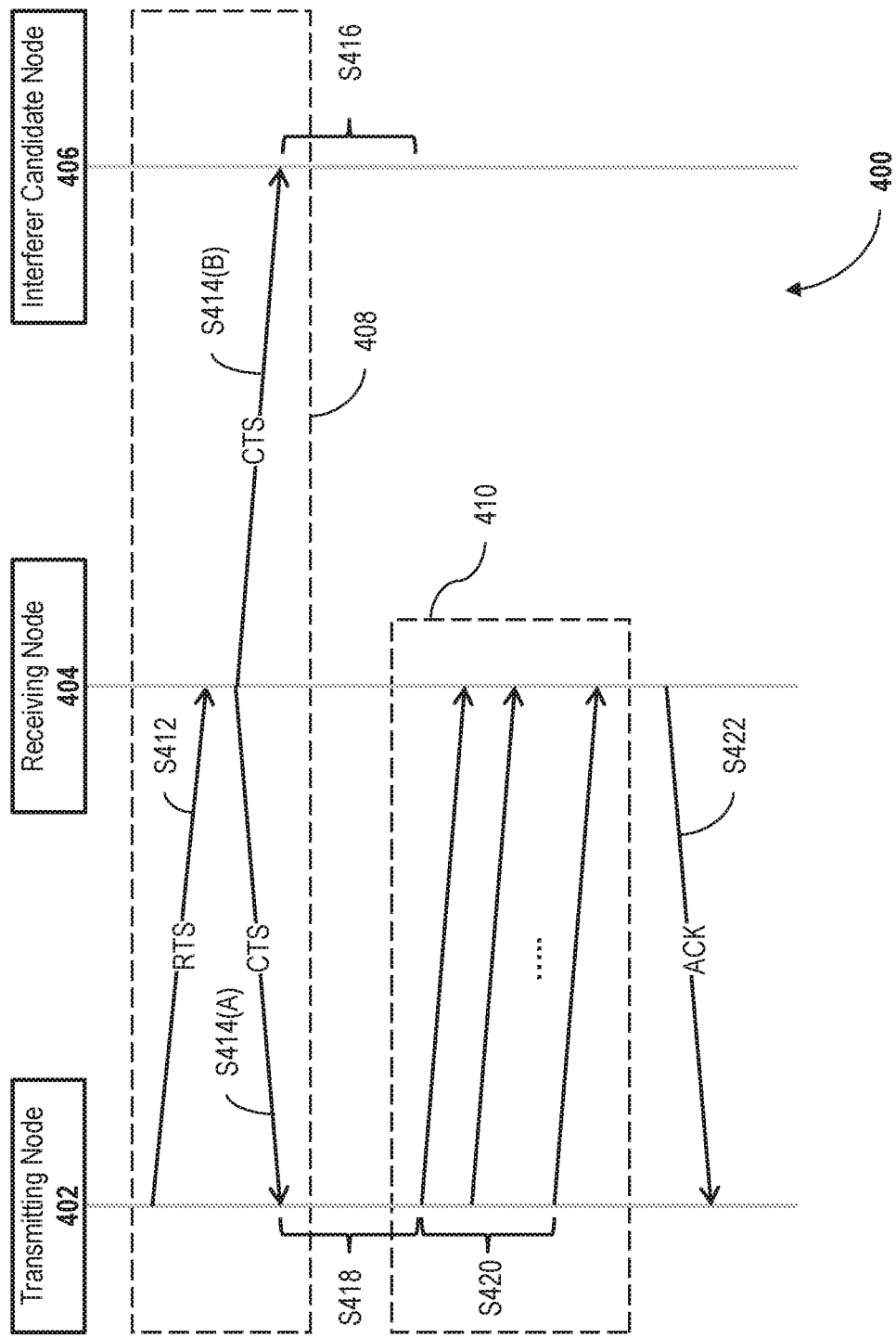
FIG. 4 is a sequence diagram for an exemplary coexistence process which may be implemented for a non-beamforming transmission, according to an embodiment.

FIG. 4 is a sequence diagram for an exemplary coexistence process 400 which may be implemented for a non-beamforming transmission. In an exemplary embodiment, process 400 illustrates steps relating to a non-beamforming transmission from a transmitting node 402 to a receiving node 404 in the vicinity of an interferer candidate node 406. That is, transmitting node 402 is configured to implement beamforming, but interferer candidate node 406 does not implement beamforming. When implemented, process 400 may execute the following steps, which are not necessarily required to be in the order listed, except where so clearly designated as being dependent on a prior step.

In this example, process 400 includes a first transmission subprocess 408 and a second transmission subprocess 410. First transmission subprocess 408 occurs without beamforming, and second transmission subprocess 410 utilizes beamforming in the transmission. Process 400 begins with first subprocess 408, and step S412. In step S412, transmitting node 402 transmits RTS data (an "RTS") to receiving node 404. In step S414, receiving node 404 transmits responsive CTS data (a "CTS") to transmitting node 402. However, as can be seen in the diagram illustrated in FIG. 4, the CTS is also received by interferer candidate node 406. According to the techniques described herein, at interferer candidate node 406, upon detection of the CTS (i.e., from step S414(B)) CCA may be performed, and interferer candidate node 406 may be configured to, in step S416, defer its transmission due to detection of the CTS. In an exemplary embodiment, for all of the relevant transmissions of first transmission subprocess 408 (i.e., data packets or ACK packets), the preamble of the respective packet is transmitted without beamforming to allow other nodes to detect the ongoing transmission. The RTS/CTS messages are also transmitted without beamforming.

Upon detection of the CTS by transmitting node 402 (i.e., from step S414(A)), transmitting node 402 initiates second transmission subprocess 410 to implement beamforming. Second transmission subprocess begins at step S418, where transmitting node 402 calculates the beamforming vector.

Second transmission subprocess 410 then proceeds to step S420, where transmitting node 402 transmits one or more data transmissions with beamforming to receiving node 404. Upon receipt of the data transmission(s) with beamforming, receiving node 404 transmits an ACK to transmitting node 402.

Thus, according to the advantageous techniques described herein, an innovative CSMA strategy is provided for a transmitting node to an employee beamforming to focus its energy toward a spatial direction of interest, thereby reducing interference to other neighboring nodes in the vicinity. Because other neighboring nodes may still transmit energy in all directions (e.g., where the neighboring nodes employ a uniform beam pattern), and intended receiver may still experience interference, and not hear the transmitted signal. The advantageous process described with respect to FIG. 4 significantly mitigates this potential problem.

According to process 400, transmitting nodes that intend to begin transmission with beamforming will advantageously first exchange small data packets and/or ACK packets, or RTS/CTS messages, without beamforming to announce the impending transmission. This exchange of small amounts of data will require some additional energy from the transmitting node, but this additional transmission energy is significantly less than the amount of transmission energy saved through the efficient use of beamforming described herein.

Figure 5:
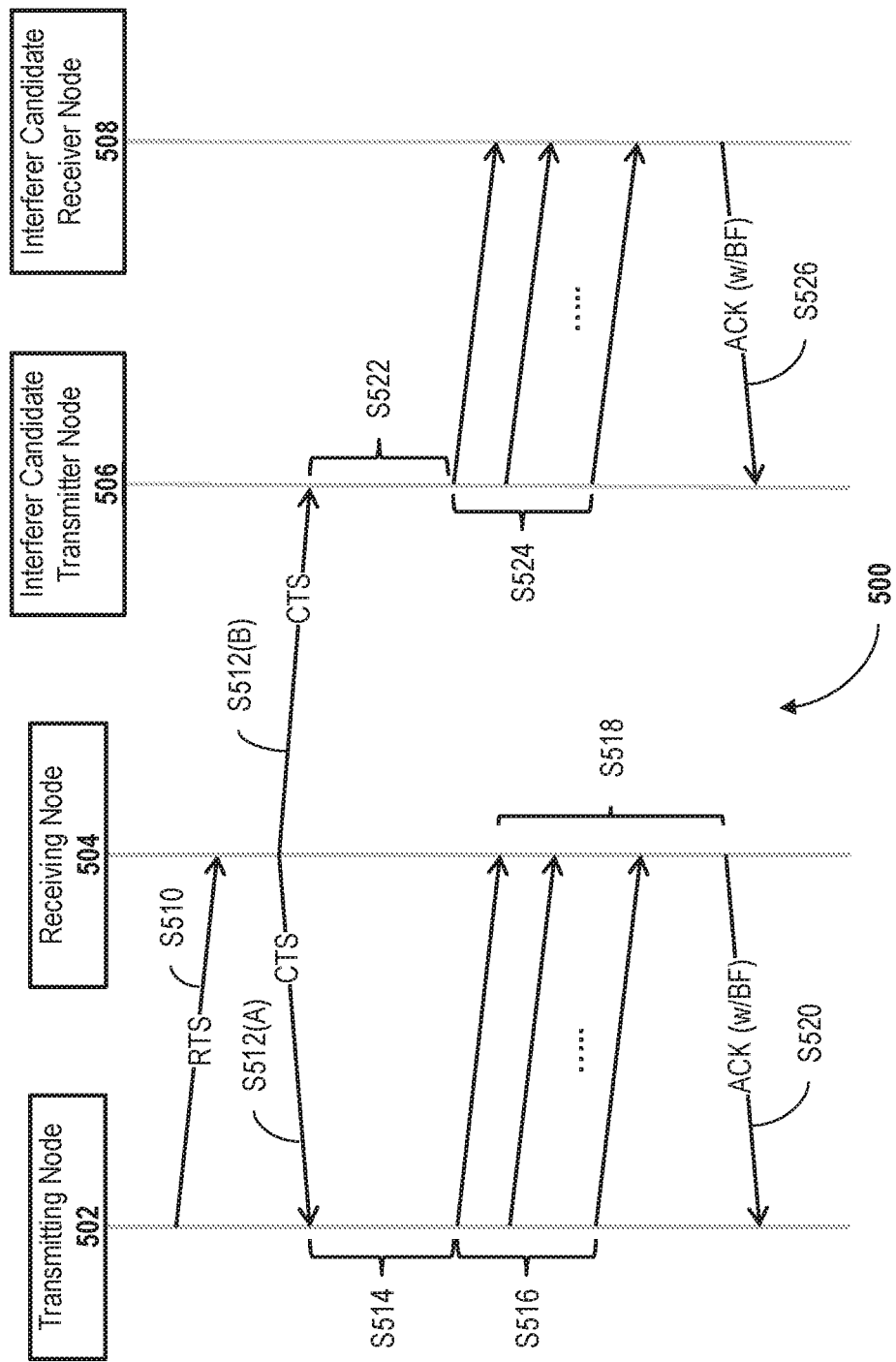
FIG. 5 is a sequence diagram for an exemplary coexistence process which may be implemented for a beamforming transmission, according to an embodiment.

FIG. 5 is a sequence diagram for an exemplary coexistence process 500 which may be implemented for a beamforming transmission. In an exemplary embodiment, process 500 illustrates steps relating to a beamforming transmission from a transmitting node 502 to a receiving node 504 in the vicinity of an interferer candidate transmitter node 506 and an interferer candidate receiver node 508 that also employ beamforming. When implemented, process 500 may execute the following steps, which are not necessarily required to be in the order listed, except where so clearly designated as being dependent on a prior step.

Process 500 begins at step S510. In step S510, transmitting node 502 transmits an RTS to receiving node 504. In step S512, receiving node 504 transmits a responsive CTS to transmitting node 502. Upon detection of the CTS by transmitting node 502 (i.e., from step S512(A)), transmitting node 502 performs transmission processing similar to second transmission subprocess 410, FIG. 4. That is, in step S514, transmitting node 502 calculates the beamforming vector, and in step S516, transmitting node 502 transmits one or more data transmissions with beamforming to receiving node 504. Process 500 then differs from second transmission subprocess 410, in that upon receipt of the data transmission(s) with beamforming, in step S518, receiving node 504 is configured to calculate the beamforming vector from the received data transmission(s). In step S520, receiving node 504 then transmits an ACK transmission with beamforming to transmitting node 502. This ACK transmission is thus different from that described above with respect to process 400 (i.e., step S422), in that the ACK of process 400 is not transmitted with beamforming (or the beamforming is optional).

Referring back to step S512, as can be seen in the diagram illustrated in FIG. 5, the CTS is also received by interferer candidate transmitter node 506. Therefore, in an exemplary embodiment, at step S522, interferer candidate transmitter node 506, upon detection of the CTS (i.e., from step S512 (B)), performs CCA with a beamforming vector targeting interferer candidate receiver node 508. In step S524, interferer candidate transmitter node 506 transmits one or more data transmissions with beamforming to interferer candidate receiver node 508. In step S528, interferer candidate receiver node 508 then transmits an ACK transmission with beamforming to interferer candidate transmitter node 506. In an exemplary embodiment, and similar to process 400, FIG. 4, preambles may be transmitted without beamforming to allow other nodes to detect the ongoing transmission. In some embodiments, the RTS/CTS messages may also be transmitted without beamforming.

Thus, according to the advantageous techniques described herein, innovative CSMA strategies are provided for a transmitting node to employ beamforming to significantly reduce transmit power in unneeded directions, whether in the vicinity of a neighboring node utilizing beamforming, or a node that does not utilized beamforming. In the embodiments described above, particular portions thereof may be implemented alone or in combination with one or more of the other respective portions. In some embodiments, the steps of the several processes may be implemented simultaneously, or in succession, except where a particular order is expressly stated. In the exemplary embodiments, a transmitter/transceiver or node utilizing beamforming is configured to a particular channel of the wireless spectrum, and may adapt its protocol in order to maintain efficiency through utilization of the spatial properties of the channel.

Accordingly, the novel systems and methods described above realize significant advantages over conventional systems that implement CSMA or utilize beamforming. The present embodiments implement innovative techniques to more efficiently utilize transmitter power according to the spatial properties of the channel, and according to the spatial beam pattern of neighboring or interfering nodes, when encountered. Algorithms to implement any or all the above described processes or techniques may be implemented within an application processor, a MAC co-processor, or the UMAC/LMAC layers of supporting architecture of a station (STA) and/or an AP, for the respective processor of a node transmitter, receiver, or transceiver.

Exemplary embodiments of CSMA protocols using beamforming are described above in detail. The systems and methods of this disclosure though, are not limited to only the specific embodiments described herein, but rather, the components and/or steps of their implementation may be utilized independently and separately from other components and/or steps described herein.

Latency Reduction of Wi-Fi with DOCSIS Backhaul

As described above with respect to FIG. 4, RTS and CTS messages and data are utilized to enhance the CSMA processing (as well as virtual carrier sensing), and also to resolve issues detected, or "hidden," nodes. That is, when a given node/STA (e.g., transmitting node 402) wants to transmit uplink traffic to an AP (e.g., receiving node 404), it is possible there are one or more nodes/STAs (e.g., interferer candidate node 406) that are hidden from the transmitting node/STA, but still within the operational range of the AP. The transmitting STA sends an RTS (e.g., step S412), indicating the request to transmit. In this instance, the RTS message further includes an amount of time desired for the transmission. The receiving AP responds with CTS (e.g., step S414(A)), indicating to the transmitting STA that it is clear to send. In this instance, the CTS further includes information regarding the amount of time that the transmission medium will be busy. The first STA may then send data traffic (e.g., data packets in step S420).

For this example, as described above, the hidden STA does not receive the original RTS, but will receive the CTS (e.g., step S414(B)), since the hidden node is within range of the AP, but not within range of the transmitting STA. Accordingly, the hidden STA will register or identify the medium as "busy" for the duration indicated in the CTS to avoid collision with the transmitting STA. However, in the case of a Wi-Fi AP connected to a modem using Data Over Cable Service Interface Specification (DOCSIS) to backhaul traffic (e.g., Internet traffic), additional factors may contribute to the latency effect in the uplink data traffic.

Figure 6:
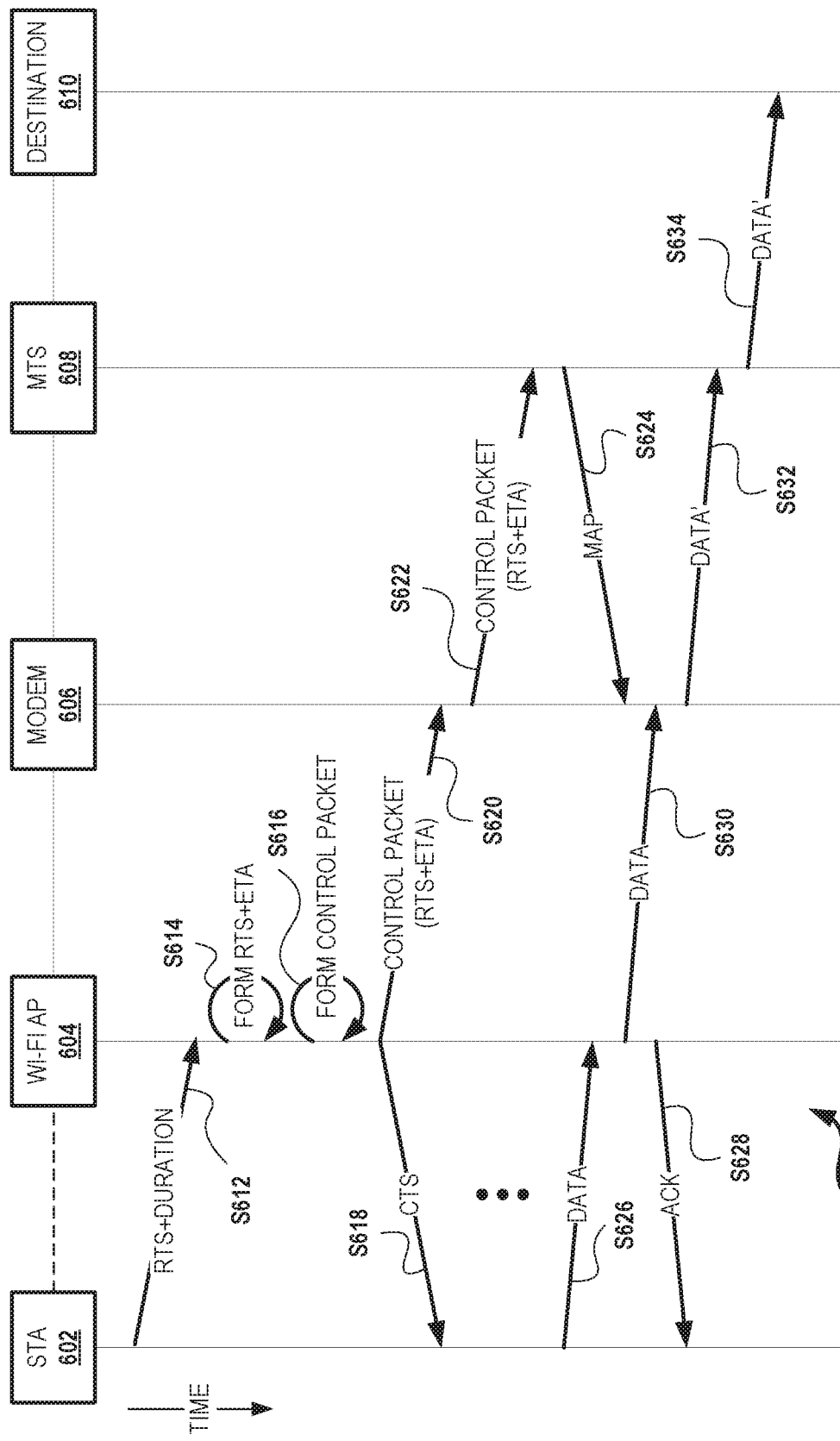
FIG. 6 is a sequence diagram for an exemplary latency reduction process, according to an embodiment.

FIG. 6 is a sequence diagram for an exemplary latency reduction process 600. In an exemplary embodiment, process 600 illustrates steps relating to an uplink transmission from a transmitting STA 602 to a receiving Wi-Fi AP 604 in operable communication with a modem 606. Modem 606 is also in communication with a modem termination unit (MTS) 608. In the exemplary embodiment, MTS 608 may include one or more of a cable modem termination system (CMTS), an optical network terminal (ONT), an optical line terminal (OLT), a network termination unit, a satellite termination unit, and/or other termination devices and systems. Similarly, modem 606 may include one or more of a cable modem (CM), an optical network unit (ONU), a digital subscriber line (DSL) unit/modem, a satellite modem, etc. Optionally, MTS 608 is further in communication with a destination device or network 610, which may be, for example, the Internet.

In operation of process 600, when Wi-Fi AP 604 is connected to modem 606 using the DOCSIS article to backhaul traffic, the uplink DOCSIS traffic will be generally subject to several independent serial operations: (i) STA 602 transmits uplink traffic to Wi-Fi AP 604; (ii) Wi-Fi AP 604 forwards received uplink traffic to modem 606; and (iii) and modem 606 transmits the uplink traffic on the DOCSIS link, e.g., MTS 608. Process 600 advantageously reduces the user plane latency for this Wi-Fi uplink traffic that is backhauled on the DOCSIS link. Specifically, when implemented, process 600 may execute the following steps, which are not necessarily required to be in the order listed, except where so clearly designated as being dependent on a prior step.

Process 600 begins at step S612. In step S612, STA 602 transmits an RTS frame for a requested transmission. In exemplary operation of step S612, the transmitted RTS frame includes a specified "duration" field to indicate the amount of time required to transmit the data frame. This specified duration for the RTS/CTS virtual carrier sense mechanism is also referred to as the Network Allocation Vector (NAV). In at least some embodiments of step S612, the transmitted RTS frame further includes the time $T_{SIFS}$ required to wait for associated Short Interframe Space(s) (SIFS, i.e., the amount of time required for a wireless interface to process the received frame and to respond with a response frame), as well as the time T required to transmit a CTS, the data, and relevant ACK frame(s). The RTS duration, $NAV_{RTS}$, may be expressed according to the equation:

$$NAV_{RTS}=T_{SIFS}+T_{CTS}+T_{SIFS}+T_{data}+T_{SIFS}+T_{ACK} \quad (Eq. 1)$$

According to embodiments described above, upon receiving the RTS with the NAV, Wi-Fi AP 604 will wait the SIFS amount of time, and then transmit the CTS, which may also include a duration field, $NAV_{CTS}$, according to the equation:

$$NAV_{CTS}=T_{SIFS}+T_{data}+T_{SIFS}+T_{ACK} \quad (Eq. 2)$$

According to process 600 though, prior to transmitting the CTS, Wi-Fi AP 604 includes additional steps to be time-synchronized with MTS 608, utilizing, for example, a synchronization protocol. In the exemplary embodiment, after receiving the RTS in step S612, process 600 causes Wi-Fi AP 604 to first execute step S614. In step S614, upon receiving the RTS frame, Wi-Fi AP 604 calculates and adds an additional time parameter, ETA, to the current time of Wi-Fi AP 604 according to the equation:

$$ETA=NAV_{RTS}-T_{SIFS}-T_{ACK}. \quad (Eq. 3)$$

In step S616, AP 604 then forms a new control packet based upon the original RTS information and the new ETA time parameter. In step S618, AP 604 transmits the CTS frame to STA 602. In step S620, AP 604 forwards the new control packet (formed in step S616) to modem 606. In at least one embodiment, steps S618 and S620 occur simultaneously. In other embodiments, steps S618 and S620 occur in the opposite order. In step S622, modem 606 forwards the received new control packet to MTS 608. In an alternative embodiment, AP 604 includes the ETA time parameter, along with a current timestamp, in the subsequent IP packet.

In further operation of process 600, upon receiving the new control packet (including the RTS frame and the ETA value in step S622), in step S624, MTS 608 generates a MAP, in response to receipt of the new control packet, to schedule resources for the coming data packet(s), and sends the generated MAP to modem 606 for the scheduled transmission of the data packet(s) from modem 606 to MTS 608 (see step S632, below). That is, after receiving the CTS frame in step S618, STA 602 transmits the data, in step S626, to AP 604. In step S628, AP 604 optionally sends an ACK message to STA 602 acknowledging the receipt of one or more data packets. In step S630, AP 604 forwards the received data to modem 606. Once the data is received by modem 606, process 600 causes modem 606 to schedule data transmission to MTS 608 according to the MAP (from step S624) and, in step S632, transmit the scheduled data packet(s) to MTS 608. Optionally, in step S634, MTS 608 may then forward the scheduled data packets to destination 610. In this example, the MAP is described with respect to cable-specific and/or DOCSIS-specific language, but the person of ordinary skill in the art will understand, after reading and comprehending the written description and drawings herein, that the MAP is an exemplary representation of a general scheduling grant, such as may be provided in other examples of communication systems.

According to the advantageous techniques of process 600, the RTS does not need to include the amount of bytes that are to be later transferred by STA 602, such as with the data. In at least one embodiment, process 600 is further configured to estimate the amount of by causing AP 604 to keep track of the modulation coding scheme (MCS) from previous transmissions. From this MCS, and utilizing the ETA parameter value, AP 604 is further enabled to calculate the expected number of bytes that will eventually arrive according to the ETA. Thus, since the RTS frames are processed by the MAC layer of AP 604, no additional latency is added from interpreting the RTS (e.g., step S614) or from forming the new control packet (e.g., step S616) by AP 604.

Accordingly, the techniques of process 600 achieve significant advantages over conventional techniques by, instead of waiting for the uplink data to arrive at the AP, information sent by the transmitting STA during the setup stage of the Wi-Fi uplink transmission is utilized to derive the expected time (e.g., ETA) of reception of the packets by the AP. The ETA may then be further utilized by the modem to start the request-grantdata processing early on the DOCSIS link, that is before the uplink data actually arrives. In some embodiments, the ETA and MAP may also be utilized for the MTS to determine when to send a just-in-time grant.

According to the advantageous systems and methods disclosed herein, a Wi-Fi device, node, and/or transceiver is capable of implementing the RTS/CTS mechanisms for Wi-Fi transmissions in a DOCSIS backhaul, without introducing further latency. Algorithms to implement any or all the above described processes may be implemented within one or more of the respective processors of the several system elements, including without limitation, an application processor, a MAC co-processor, or the UMAC/LMAC layers of supporting architecture of a station/STA, node, and/or AP.

Exemplary embodiments of CSMA management of Wi-Fi uplink traffic that is backhauled on the DOCSIS link are described above in detail. The systems and methods of this additional disclosure though, are not limited to only the specific embodiments described herein, but rather, the components and/or steps of their implementation may be utilized independently and separately from other components and/or steps described herein.

Although specific features of various embodiments of the disclosure may be shown in some drawings and not in others, this convention is for convenience purposes and ease of description only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A wireless communication node, comprising:
   a receiver configured to detect, over a wireless communication channel, a request to send (RTS) message from a transmitting station within a communication vicinity of the wireless communication node, wherein the RTS message includes at least one duration field; a processor configured to (i) calculate an estimated time parameter, (ii) add the estimated time parameter to a current timestamp of the wireless communication node, and (iii) form a control packet from the RTS message, the at least one duration field, and the estimated time parameter; and
   a transmitter configured to transmit over the wireless communication channel (i) a clear to send (CTS) message the transmitting station, and (ii) the control packet to a modem in operable communication with the wireless communication channel.

2. The wireless communication node of claim 1, wherein the receiver is further configured to receive one or more data packets from the transmitting station, and wherein the transmitter is further configured to forward the received one or more data packets to the modem.

3. The wireless communication node of claim 2, wherein the control packet is configured to enable a modem termination system (MTS) in communication with the modem to synchronize with the wireless communication node.

4. The wireless communication node of claim 3, wherein the control packet is further configured to trigger the MTS to generate a MAP to send to the modem.

5. The wireless communication node of claim 4, wherein the processor is further configured to cause the modem, upon receipt of the forwarded one or more data packets, to schedule the one or more data packets from the modem to the MTS according to the MAP.

6. The wireless communication node of claim 3, wherein the MTS comprises one or more of a cable modem termination system, an optical network terminal, an optical line terminal, a network termination unit, and a satellite termination unit.

7. The wireless communication node of claim 2, wherein the duration field of the RTS message comprises a network allocation vector $NAV_{RTS}$.

8. The wireless communication node of claim 7, wherein the RTS and CTS messages include a plurality of short interframe spaces (SIFS), wherein the wireless communication node is further configured to transmit at least one ACK message to the transmitting station, and wherein the $NAV_{RTs}$ is expressed according to:

$$NAVrts = T\text{sifs} + T\text{cts} + T\text{sifs} + T\text{data} + T\text{sifs} + T\text{ack},$$

where $Ts_{IFS}$ is the time required to transmit one or more of the plurality of SIFS, $TC_{TS}$ is the time required to transmit the CTS, $T_{RTS}$ is the time required to transmit the RTS, $T_{data}$ is the time required to transmit the one or more data packets, and $T_{ACK}$ is the time required to transmit the at least one ACK message.

9. The wireless communication node of claim 8, wherein the CTS message includes a duration field $NAV_{CTS}$ is expressed according to:

$$NAVcts = T\text{sifs} + T\text{data} + T\text{SIFS} + T\text{ACK}.$$

10. The wireless communication node of claim 8, wherein the estimated time parameter ETA is expressed according to: ETA=NAVrts−Tsifs−Tack.

11. The wireless communication node of claim 1, wherein the wireless communication node comprises a Wi-Fi access point.

12. The wireless communication node of claim 1, wherein the wireless communication node is configured to implement a Data Over Cable Service Interface Specification protocol to backhaul data traffic.

13. The wireless communication node of claim 1, wherein the processor is further configured to implement a carrier sense multiple access with collision detection protocol.

14. The wireless communication node of claim 1, wherein the modem comprises one or more of a cable modem, an optical network unit, a digital subscriber line unit, and a satellite modem.

15. A method for transmitting over a wireless communication channel implementing Wi-Fi transmissions in a Data Over Cable Service Interface Specification (DOCSIS) backhaul by a first node employing a carrier sense multiple access (CSMA) protocol, the method comprising the steps of receiving a request to send (RTS) message from a second node transmitting within a vicinity of the first node, wherein the RTS message includes a duration field; calculating an estimated time parameter based at least in part on the duration field; forming a control packet from the received RTS message and the estimated time parameter; and transmitting (i) a clear to send (CTS) message to the second node, and (ii) the control packet to at least one modem device.

16. The method of claim 15, further comprising a step of causing the modem device to forward the control packet to a modem termination system (MTS) device.

17. The method of claim 16, further comprising a step of triggering the MTS device to generate a MAP for scheduling data transmission from the modem device.

18. The method of claim 17, further comprising, after the step of transmitting the CTS message, a step of causing the modem device to transmit one or more data packets, received from the second node, to the MTS device according to the generated MAP.

19. The method of claim 18, further comprising a step of enabling the MTS device to forward the scheduled one or more data packets to the Internet.

20. The method of claim 18, wherein the modern comprises one or more of a cable modem, an optical network unit, a digital subscriber line unit, and a satellite modem, and wherein the MTS device comprises one or more of a cable modem termination system, an optical network terminal, an optical line terminal, a network termination unit, and a satellite termination unit.

* * * * *